(12) United States Patent
Jeong (10) Patent No.: US 8,181,199 B2
(45) Date of Patent: May 15, 2012

(54) METHOD FOR DISPLAYING INTERNET TELEVISION INFORMATION OF BROADCASTING RECEIVER AND BROADCASTING RECEIVER ENABLING THE METHOD

(75) Inventor: Yun Oh Jeong, Gumi-si (KR)

(73) Assignee: LG Electronics Inc., Seoul (KR)

( * ) Notice: Subject to any disclaimer, the term of this patent is extended or adjusted under 35 U.S.C. 154(b) by 343 days.

(21) Appl. No.: 12/663,907

(22) PCT Filed: Jun. 11, 2008

(86) PCT No.: PCT/KR2008/003251
§ 371 (c)(1),
(2), (4) Date: Dec. 10, 2009

(87) PCT Pub. No.: WO2008/153310
PCT Pub. Date: Dec. 18, 2008

(65) Prior Publication Data
US 2010/0186039 A1    Jul. 22, 2010

(30) Foreign Application Priority Data
Jun. 11, 2007  (KR) .................. 10-2007-0056587

(51) Int. Cl.
*H04N 5/445* (2011.01)
(52) U.S. Cl. ............ 725/43; 725/39; 725/40; 725/48; 725/49; 725/50; 725/109; 725/110
(58) Field of Classification Search ............. 725/39–40, 725/43, 48–50, 109–110
See application file for complete search history.

(56) References Cited

U.S. PATENT DOCUMENTS

| | | | |
|---|---|---|---|
| 6,859,799 B1 | 2/2005 | Yuen | |
| 6,978,471 B1 * | 12/2005 | Klopfenstein | 725/50 |
| 7,152,236 B1 * | 12/2006 | Wugofski et al. | 725/40 |
| 7,496,946 B1 * | 2/2009 | Wehmeyer et al. | 725/59 |
| 7,877,769 B2 * | 1/2011 | Corl | 725/39 |
| 2006/0064716 A1 * | 3/2006 | Sull et al. | 725/37 |
| 2007/0277199 A1 * | 11/2007 | Yoon et al. | 725/39 |

FOREIGN PATENT DOCUMENTS
WO  WO 2007/052923  5/2007

OTHER PUBLICATIONS
International Search Report dated Oct. 10, 2008.

* cited by examiner

*Primary Examiner* — Son P Huynh
(74) *Attorney, Agent, or Firm* — Ked & Associates LLP (57) ABSTRACT

The present invention relates to a method for, when a broadcasting receiver outputs a broadcast program, determining whether the same program is present in a program list of an Internet television (TV) provided by an Internet server, and performing a notification function when the same program is present in the program list of the Internet TV, and a broadcasting receiver employing the same.

10 Claims, 6 Drawing Sheets

FIG. 1

Prior Art

| Title \ Broadcasting station | KBS | SBS | MBC |
|---|---|---|---|
| | 301 | 302 | 303 |
| 1 | Yoon Do Hyun's Love Letter episode 146 | TV Animal Farm episode 55 | Unstoppable High Kick episode 20 |
| 2 | To Me episode 13 | What On Earth Is It episode 105 | It episode 105 |
| 3 | Bad Girl episode 14 | Culture Preview episode 55 | Moon Hee episode 45 |
| ⋮ | ⋮ | ⋮ | ⋮ |

304 points to the MBC cell in row 2.

| Broadcasting station (501) | Title (502) | Provided from Internet TV (503) | Directory (504) |
|---|---|---|---|
| SBS | Hit episode 15 | ◯ | SBS/art.... |
| MBC | Dae Jo Young | — | — |
| SBS | Animal Farm episode 225 | ◯ | SBS/art.... |
| ⋮ | ⋮ | ⋮ | ⋮ |

FIG. 6

METHOD FOR DISPLAYING INTERNET TELEVISION INFORMATION OF BROADCASTING RECEIVER AND BROADCASTING RECEIVER ENABLING THE METHOD

TECHNICAL FIELD

The present invention relates to a method for, when a broadcasting receiver outputs a broadcast program determining whether the same program is present in a program list of an Internet television (TV) provided by an Internet server, and performing a notification function when the same program is present in the program list of the Internet TV, and a broadcasting receiver employing the same.

BACKGROUND ART

Nowadays, with the development of the Internet, an Internet TV has become widespread which is connected with a broadcasting receiver to provide broadcast programs provided by an Internet server to the broadcasting receiver.

Figure 1:
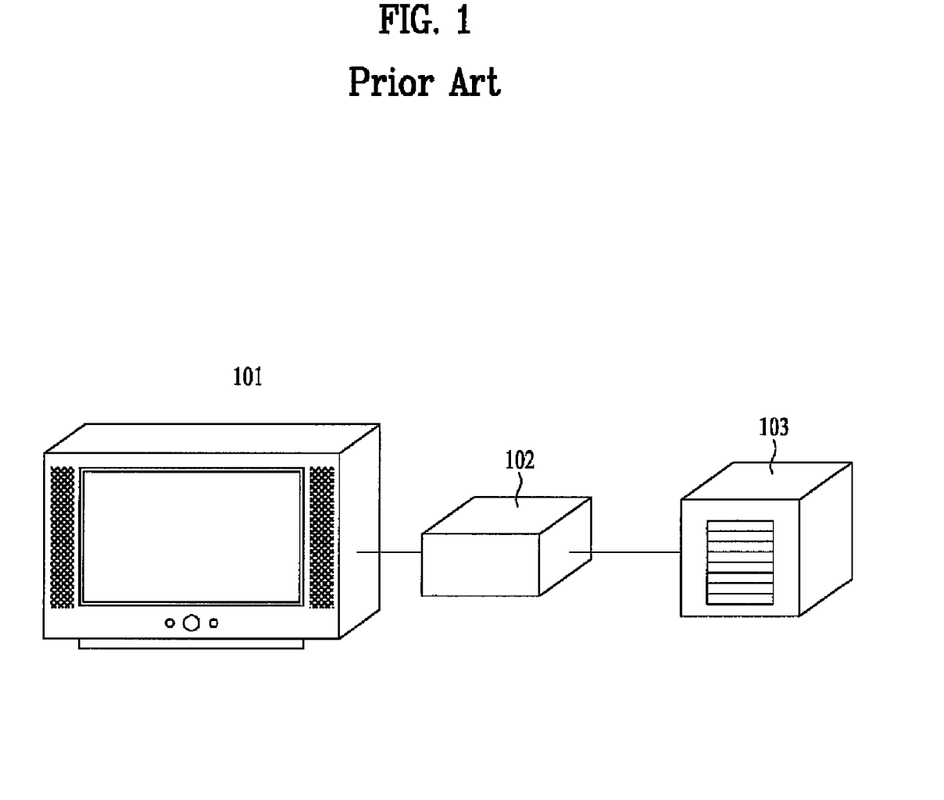
FIG. 1 is a view showing an example of networking of a conventional broadcasting receiver, an Internet TV and an Internet server.

FIG. 1 shows an example of networking of a conventional broadcasting receiver, an Internet TV and an Internet server.

Referring to FIG. 1, the conventional broadcasting receiver, denoted by reference numeral 101, is connected with the Internet TV, denoted by reference numeral 102, which is in turn networked with the Internet server, denoted by reference numeral 103.

The Internet TV 102 enables the broadcasting receiver 101 to output broadcast programs provided from the Internet server 103. At this time, the broadcast programs provided from the Internet server 103 may include a broadcast program of terrestrial broadcasting, a broadcast program of cable broadcasting, domestic and foreign movies, etc.

On the other hand, in the conventional broadcasting receiver, a broadcast program received and outputted by a tuner and a broadcast program provided by the Internet TV are independent of each other, and the user selects and views one of the broadcast program received by the tuner or the broadcast program provided by the Internet TV in the broadcasting receiver.

Notably, in the conventional broadcasting receiver, if the user does other work while a terrestrial broadcast program is provided, he/she cannot view the terrestrial broadcast program. In contrast, because the Internet TV provides a broadcast program provided from the Internet server, the user can view the broadcast program at any time.

However, the conventional broadcasting receiver does not utterly provide the user with information about whether a terrestrial broadcast program currently provided by the broadcasting receiver is provided from the Internet TV. For this reason, in order to know whether the terrestrial broadcast program is provided from the Internet TV, the user has the inconvenience of having to output and confirm a program list of the Internet TV.

Therefore, in order to solve this conventional inconvenience, there is a keen need for the development of a method capable of simply and conveniently providing information about whether a broadcast program currently broadcast is provided from an Internet TV, and a broadcasting receiver employing the method.

DISCLOSURE OF INVENTION

Technical Problem

An object of the present invention devised to solve the problem lies on an operating method of a broadcasting receiver which is capable of, when a broadcast program currently received through a tuner is outputted to display means, determining, with reference to a program list of an Internet TV, whether the broadcast program is provided from the Internet TV and, in the case where the broadcast program is provided from the Internet TV, outputting information about such a situation to the display means through a popup on-screen display (OSD) or information OSD, thereby enabling the user to determine whether to view the broadcast program currently received through the tuner or the broadcast program provided from the Internet TV, thus increasing the user' convenience, and a broadcasting receiver employing the same.

Another object of the present invention devised to solve the problem lies on an operating method of a broadcasting receiver which is capable of providing the user with information about whether broadcast programs received or to be received for a certain period of time by the broadcasting receiver, as well as a broadcast program currently received by the broadcasting receiver, are provided from an Internet TV, thereby enabling the user to determine whether to view a broadcast program received through a tuner or a broadcast program provided from the Internet TV, thus increasing the user' convenience, and a broadcasting receiver employing the same.

Technical Solution

The object of the present invention can be achieved by providing an operating method of a broadcasting receiver comprising: parsing Program and System Information Protocol (PSIP) information of a broadcast program received through a tuner to determine title information or identifier information of the broadcast program; determining whether the broadcasting receiver has been connected with an Internet TV; determining whether the title information or identifier information is included in a program list of the Internet TV, if it is determined that the broadcasting receiver has been connected with the Internet TV; and outputting a user interface notifying that the broadcast program is provided from the Internet TV, to display means, if it is determined that the title information or identifier information is included in the program list.

In another aspect of the present invention, provided herein is an operating method of a broadcasting receiver comprising: parsing PSIP information of a plurality of broadcast programs received through a tuner to determine title information or identifier information of the broadcast programs; determining whether the broadcasting receiver has been connected with an Internet TV; determining whether the title information or identifier information is included in a program list of the Internet TV, if it is determined that the broadcasting receiver has been connected with the Internet TV; and outputting, to display means, a user interface including information about whether the title information or identifier information is included in the program list.

In another aspect of the present invention, provided herein is a broadcasting receiver comprising: a program information determiner for parsing PSIP information of a broadcast program received through a tuner to determine title information or identifier information of the broadcast program; a program list determiner for determining whether the broadcasting receiver has been connected with an Internet TV, and then determining whether the title information or identifier information is included in a program list of the Internet TV, upon determining that the broadcasting receiver has been connected with the Internet TV; and a user interface unit for outputting a user interface notifying that the broadcast program is provided from the Internet TV, to display means, if it is determined that the title information or identifier information is included in the program list.

In a further aspect of the present invention, provided herein is a broadcasting receiver comprising: a program information determiner for parsing PSIP information of a plurality of broadcast programs received through a tuner to determine title information or identifier information of the broadcast programs; a program list determiner for determining whether the broadcasting receiver has been connected with an Internet TV, and then determining whether the title information or identifier information is included in a program list of the Internet TV, upon determining that the broadcasting receiver has been connected with the Internet TV; and a user interface unit for outputting, to display means, a user interface including information about whether the title information or identifier information is included in the program list.

Advantageous Effects

According to the present invention, when a broadcast program currently received through a tuner is outputted to display means, a determination is made, with reference to a program list of an Internet TV, as to whether the broadcast program is provided from the Internet TV. In the case where the broadcast program is provided from the Internet TV, information about such a situation is outputted to the display means through a popup on-screen display (OSD) or information OSD, so that the user can determine whether to view the broadcast program currently received through the tuner or the broadcast program provided from the Internet TV. Therefore, it is possible to increase the user' convenience.

Also, a broadcasting receiver of the present invention provides the user with information about whether broadcast programs received or to be received for a certain period of time by the broadcasting receiver, as well as a broadcast program currently received by the broadcasting receiver, are provided from an Internet TV, so that the user can determine whether to view a broadcast program received through a tuner or a broadcast program provided from the Internet TV. Therefore, it is possible to increase the user' convenience.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

An operating method of a broadcasting receiver and a broadcasting receiver employing the same according to the present invention will hereinafter be described in detail with reference to the annexed drawings.

Figure 2:
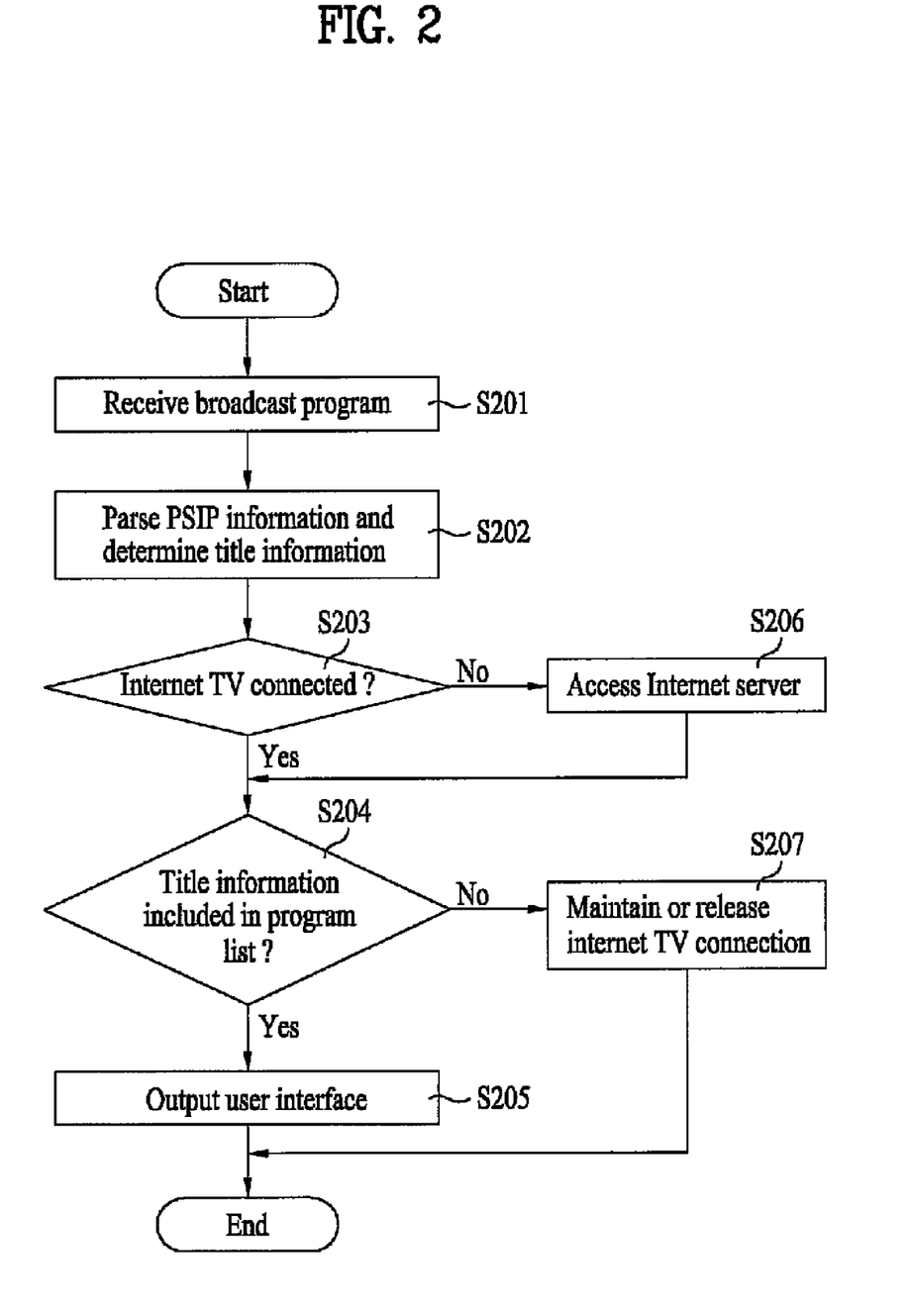
FIG. 2 is a flowchart illustrating an operating process of a broadcasting receiver according to one embodiment of the present invention.

FIG. 2 is a flowchart illustrating an operating process of a broadcasting receiver according to one embodiment of the present invention. Referring to FIG. 2, the broadcasting receiver receives a broadcast signal corresponding to a broadcast program through a tuner at step S201.

At this time, the broadcast program may be a terrestrial broadcast program, a cable broadcast program, a satellite broadcast program or a broadcast program corresponding to another broadcast signal. Preferably, the broadcast signal includes Program and System Information Protocol (PSIP) information which is information about the broadcast program.

At step S202, the broadcasting receiver parses the PSIP information of the broadcast program received through the tuner to determine title information or identifier information of the broadcast program.

For example, the broadcasting receiver may determine title information 'Hit episode 15 ' of the broadcast program or identifier information' 15 of the broadcast program by parsing the PSIP information of the broadcast program received through the tuner.

Although the title information or identifier information has been described in the present embodiment for illustrative purposes to be used to identify the broadcast program, any broadcast program identifiable information other than the title information or identifier information may be used instead of or together with the title information or identifier information.

For example, broadcasting station information 'MBC' or broadcast program identification code, besides the title information 'Hit episode 15' may be used instead of or together with the title information or identifier information to identify the broadcast program.

At step S203, the broadcasting receiver determines whether it has been connected with an Internet TV. The Internet TV is means which is connected between the broadcasting receiver and an Internet server to provide a broadcast program provided from the Internet server to the broadcasting receiver.

Upon determining at step S203 that the broadcasting receiver has been connected with the Internet TV, the broadcasting receiver determines at step S204 whether the title information is included in a program list of the Internet TV. At this time, the program list of the Internet TV can be read from storage means included in the Internet TV.

Figure 3:
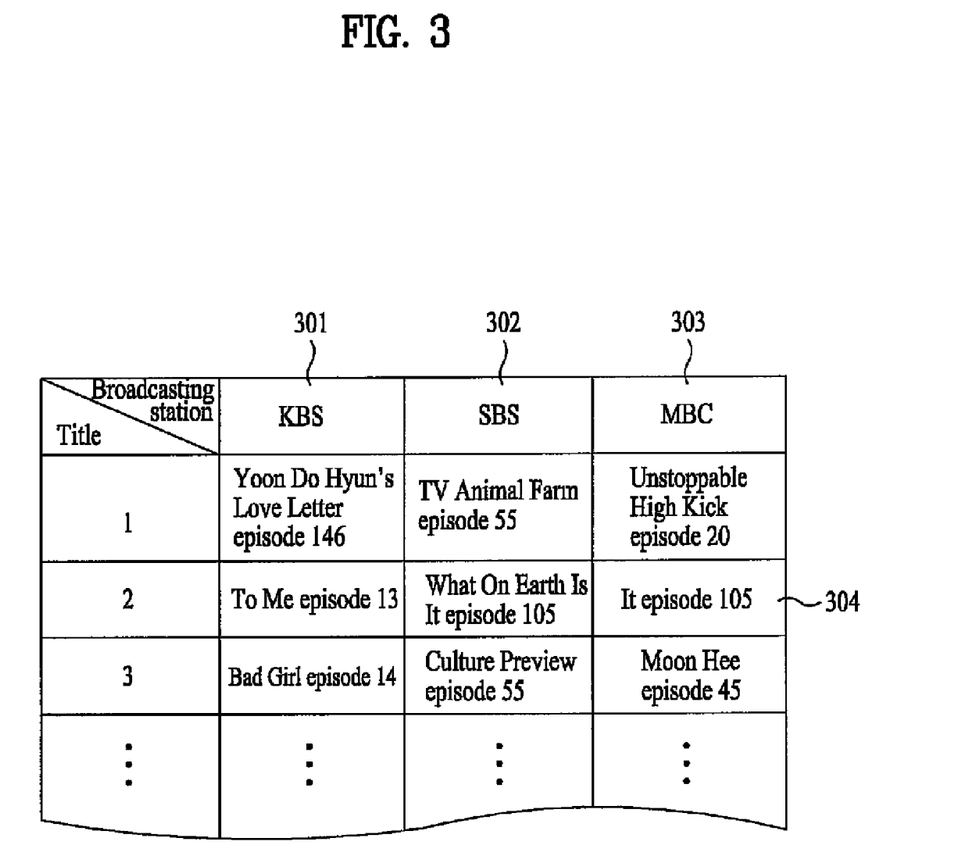
FIG. 3 is a view showing a program list according to one embodiment of the present invention.

FIG. 3 shows a program list according to one embodiment of the present invention. Referring to FIG. 3, the program list includes title information by broadcasting stations 301, 302 and 303 or by broadcasting times.

The broadcasting receiver searches the program list for title information corresponding to a broadcast program currently broadcast. For example, the broadcasting receiver determines whether 'Hit episode' 304 is included in the program list of FIG. 3.

At this time, as stated previously, reference may be made to broadcasting station information or broadcast program identification code, besides the title information or identifier information of the broadcast program.

In the case where it is determined at step S204 that the title information of the broadcast program is included in the program list of the Internet TV, the broadcasting receiver, at step S205, outputs, to display means, a user interface which notifies, on a display screen, that the broadcast program is provided from the Internet TV.

At this time, the user interface which is outputted to the display means can be set to a popup OSD or information OSD according to the user s selection.

In the case where the user interface is set to the popup OSD, the broadcasting receiver can output, to the display means, the popup OSD which notifies that the broadcast program is provided from the Internet TV.

Figure 4:
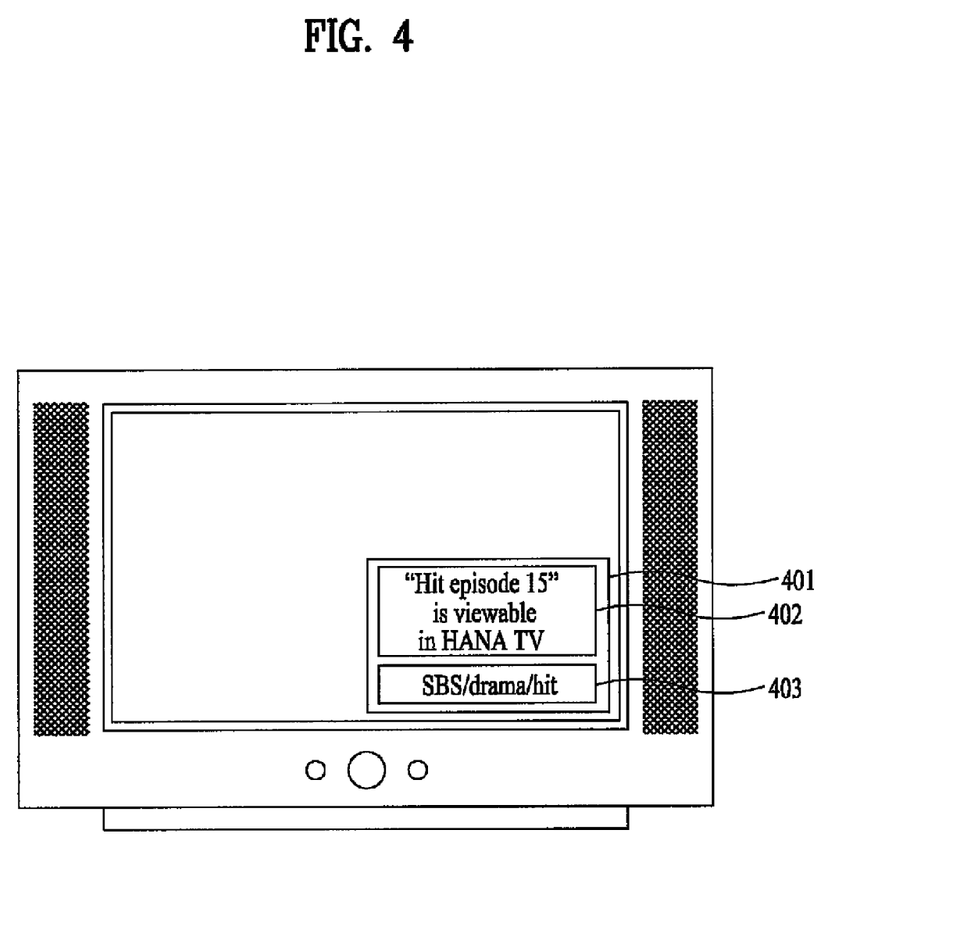
FIG. 4 is a view showing one embodiment of a popup OSD according to the present invention.

FIG. 4 shows one embodiment of the popup OSD according to the present invention. Referring to FIG. 4, the broadcasting receiver of the present invention may output the popup OSD as denoted by reference numeral 401. The popup OSD 401 may include information 'Hit episode 15 is viewable in HANA TV' 402, and directory information 402 with which the corresponding broadcast program can be found in the Internet TV.

*On the other hand, in the case where the user interface is set to the information OSD, the broadcasting receiver may output the information OSD to the display means when the user selects and inputs a predetermined key under the condition that the broadcast program is outputted to the display means.

At this time, similarly to the popup OSD of FIG. 4, the information OSD may include information 'Hit episode 15 is viewable in HANA TV' and directory information with which the corresponding broadcast program can be found in the Internet TV.

When it is determined at step S203 in FIG. 2 that the broadcasting receiver has not been connected with the Internet TV, the broadcasting receiver accesses an Internet server associated with the Internet TV at step S206 to determine whether the title information or identifier information is included in the program list of the Internet TV.

The Internet server associated with the Internet TV may be a server from which the Internet TV receives a broadcast program. For example, in the case where the Internet TV is a 'HANA TV' receiver, the Internet server may be a server that provides a broadcast program of 'HANA TV'

The Internet server may record and maintain a program list in a predetermined database thereof. In this case, the broadcasting receiver accesses the database of the Internet server and determines whether the title information or identifier information of the broadcast program is included in the program list.

For example, the database of the Internet server may record and maintain the program list as shown in FIG. 3, and the broadcasting receiver may determine whether the title information of the broadcast program is included in the program list, with reference to the database of the Internet server.

In the case where it is determined at step S204 that the title information is not included in the program list, the broadcasting receiver maintains or releases the connection with the Internet TV at step S207. At this time, the broadcasting receiver can maintain or release the connection with the Internet TV according to the determination result of step S203. That is, the broadcasting receiver maintains the connection with the Internet TV if it has been determined at step S203 that the broadcasting receiver has been connected with the Internet TV, and releases the connection with the Internet TV if it has been determined at step S203 that the broadcasting receiver has not been connected with the Internet TV.

Therefore, according to the present invention, when a broadcast program currently received through the tuner is outputted to the display means, a determination is made as to whether the broadcast program is provided from the Internet TV, with reference to the program list of the Internet TV. In the case where the broadcast program is provided from the Internet TV, information about such a situation is outputted to the display means through the popup OSD or information OSD, so that the user can determine whether to view the broadcast program currently received through the tuner or the broadcast program provided from the Internet TV. As a result, it is possible to increase the user convenience.

Alternatively, the broadcasting receiver of the present invention may parse PSIP data to extract a plurality of title information therefrom, determine whether the extracted title information is included in the program list of the Internet TV, and output information about whether the extracted title information is included in the program list of the Internet TV, to the display means.

For example, the broadcasting receiver may parse PSIP data to extract, therefrom title information of a plurality of broadcast programs to be broadcast for a certain period of time, determine whether the extracted title information is included in the program list of the Internet TV, include information about whether the extracted title information is included in the program list of the Internet TV, in the popup OSD or information OSD, and output the resulting popup OSD or information OSD to the display means.

Similarly, in this case, the broadcasting receiver refers to the program list of the Internet TV when it has been connected with the Internet TV. Conversely, when the broadcasting receiver has not been connected with the Internet TV, it accesses an Internet server associated with the Internet TV and determines whether the title information is included in the program list of the Internet TV, with reference to the program list.

Figure 5:
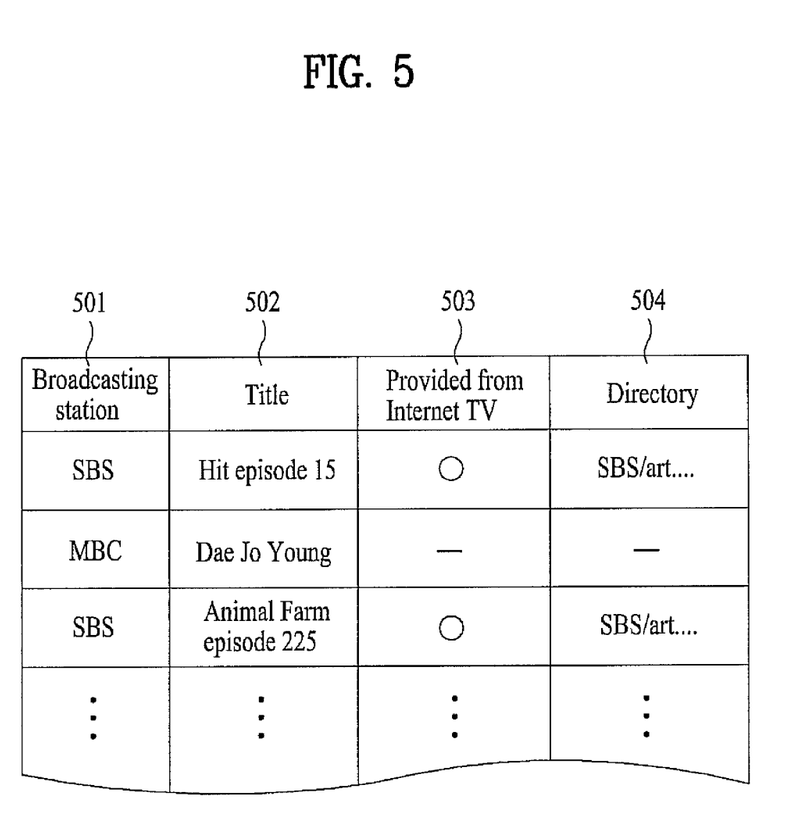
FIG. 5 is a view showing one embodiment of a user interface which provides information about whether broadcast programs received through a tuner are provided from an Internet TV, according to the present invention.

FIG. 5 shows one embodiment of a user interface which provides information about whether broadcast programs received through a tuner are provided from an Internet TV, according to the present invention. Referring to FIG. 5, a broadcasting receiver of the present invention can provide the user with a user interface including broadcasting station information 501 and title information 502 of broadcast programs to be provided for a certain period of time, information 503 about whether the broadcast programs are provided from the Internet TV, and directory information 504 provided from the Internet TV. At this time, the user interface can be implemented in the form of a popup OSD or information OSD.

Therefore, the broadcasting receiver of the present invention provides the user with information about whether broadcast programs received or to be received for a certain period of time by the broadcasting receiver, as well as a broadcast program currently received by the broadcasting receiver, are provided from an Internet TV, so that the user can determine whether to view a broadcast program received through the tuner or a broadcast program provided from the Internet TV. Therefore, it is possible to increase the user' convenience.

Figure 6:
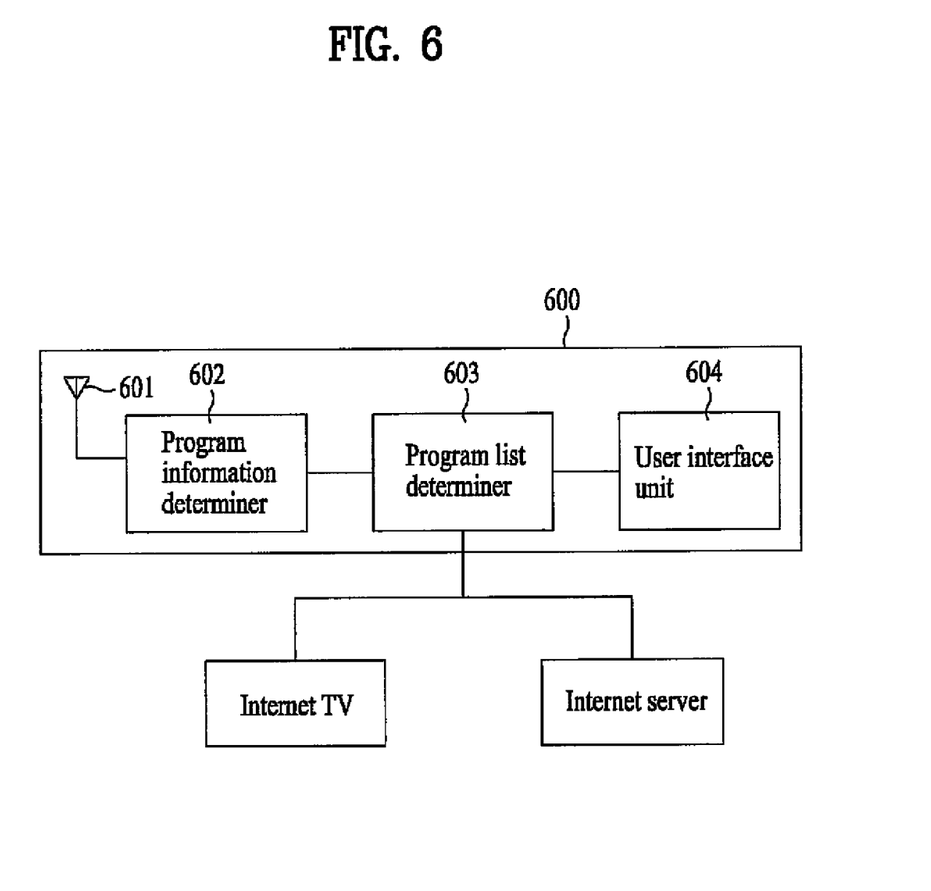
FIG. 6 is a block diagram showing the configuration of a broadcasting receiver according to one embodiment of the present invention.

FIG. 6 is a block diagram showing the configuration of a broadcasting receiver according to one embodiment of the present invention. Referring to FIG. 6, the broadcasting receiver according to this embodiment includes a tuner 601, a program information determiner 602, a program list determiner 603, and a user interface unit 604.

The tuner 601 receives a broadcast signal corresponding to a broadcast program.

The program information determiner 602 parses PSIP information of the broadcast program received through the tuner 601 to determine title information or identifier information of the broadcast program.

The program list determiner 603 determines whether the broadcasting receiver has been connected with an Internet TV, and then determines whether the title information or identifier information is included in a program list of the Internet TV, upon determining that the broadcasting receiver has been connected with the Internet TV.

In the case where the broadcasting receiver has not been connected with the Internet TV, the program list determiner 603 accesses an Internet server associated with the Internet TV to determine whether the title information or identifier information is included in the program list of the Internet TV.

In the case where the title information or identifier information is not included in the program list, the program list determiner 603 maintains or releases the connection with the Internet TV according to the result of the determination as to whether the broadcasting receiver has been connected with the Internet TV.

In the case where the title information or identifier information is included in the program list, the user interface unit 604 outputs, to display means, a user interface which notifies, on a display screen, that the broadcast program is provided from the Internet TV. At this time, the user interface can be set to a popup OSD or information OSD according to the user's selection.

The information OSD may be outputted to the display means when the user selects and inputs a predetermined key under the condition that the broadcast program is outputted to the display means.

In another embodiment of the present invention, the program information determiner 602 of the broadcasting receiver parses PSIP information of a plurality of broadcast programs received through the tuner 601 to determine title information or identifier information of the broadcast programs.

The program list determiner 603 determines whether the broadcasting receiver has been connected with an Internet TV, and then determines whether the title information or identifier information is included in a program list of the Internet TV, upon determining that the broadcasting receiver has been connected with the Internet TV.

In the case where the broadcasting receiver has not been connected with the Internet TV, the program list determiner 603 accesses an Internet server associated with the Internet TV to determine whether the title information or identifier information is included in the program list of the Internet TV.

The user interface unit 604 outputs, to the display means, a user interface including information about whether the title information or identifier information is included in the program list. This user interface is the same as that stated previously with reference to FIG. 5.

The broadcasting receiver of the present invention has been described and the technical contents disclosed in the above embodiments are directly applicable to the broadcasting receiver of FIG. 6, and a detailed description of the broadcasting receiver of FIG. 6 will thus be omitted.

It will be apparent to those skilled in the art that various modifications and variations can be made in the present invention without departing frau the spirit or scope of the invention. Thus, it is intended that the present invention cover the modifications and variations of this invention provided they come within the scope of the appended claims and their equivalents.

Mode for the Invention

Various embodiments have been described in the best mode for carrying out the invention.

Industrial Applicability

As apparent from the above description, according to the present invention, when a broadcasting receiver outputs a broadcast program, it can determine whether the same program is present in a program list of an Internet TV provided by an Internet server, and perform a notification function when the same program is present in the program list of the Internet TV.

The invention claimed is:

1. An operating method of a broadcasting receiver comprising:
    parsing Program and System Information Protocol (PSIP) information of a broadcast program received through a tuner of the broadcasting receiver to determine title information or identifier information of the broadcast program;
    determining whether the broadcasting receiver has been connected with an Internet TV; determining whether the tide information or identifier information is included in a program list of the Internet TV, if it is determined that the broadcasting receiver has been connected with the Internet TV;
    outputting a user interface notifying that the broadcast program is provided from the Internet TV, to display means, if it is determined that the tide information or identifier information is included in the program list; and
    further comprising accessing an Internet server associated with the Internet TV to determine whether the tide information or identifier information is included in the program list of the Internet TV, if it is determined that the broadcasting receiver has not been connected with the Internet TV.

2. The operating method according to claim 1, wherein the user interface is set to a popup on-screen display (OSD) or information OSD according to a user' selection.

3. The operating method according to claim 2, wherein the information OSD is outputted to the display means when the user selects and inputs a predetermined key under the condition that the broadcast program is outputted to the display means.

4. The operating method according to claim 1, further comprising maintaining or releasing the connection with the Internet TV according to a result of the determination as to whether the broadcasting receiver has been connected with the Internet TV, if it is determined that the title information or identifier information is not included in the program list.

5. An operating method of a broadcasting receiver comprising:
    parsing PSIP information of a plurality of broadcast programs received through a tuner of the broadcasting receiver to determine title information or identifier information of the broadcast programs;
    determining whether the broadcasting receiver has been connected with an Internet TV;
    determining whether the title information or identifier information is included in a program list of the Internet TV, if it is determined that the broadcasting receiver has been connected with the Internet TV;
    outputting, to display means, a user interface including information about whether the title information or identifier information is included in the program list; and
    further comprising accessing an Internet server associated with the Internet TV to determine whether the title information or identifier information is included in the program list of the Internet TV, if it is determined that the broadcasting receiver has not been connected with the Internet TV.

6. A broadcasting receiver comprising:
    a program information determiner for parsing PSIP information of a broadcast program received through a tuner of the broadcasting receiver to determine title information or identifier information of the broadcast program;

a program list determiner for determining whether the broadcasting receiver has been connected with an Internet TV, and then determining whether the title information or identifier information is included in a program list of the Internet TV, upon determining that the broadcasting receiver has been connected with the Internet TV;

a user interface unit for outputting a user interface notifying that the broadcast program is provided from the Internet TV, to display means, if it is determined that the title information or identifier information is included in the program list; and wherein the program list determiner accesses an Internet server associated with the Internet TV to determine whether the title information or identifier information is included in the program list of the Internet TV, if it is determined that the broadcasting receiver has not been connected with the Internet TV.

7. The broadcasting receiver according to claim 6, wherein the user interface is set to a popup OSD or information OSD according to a user' selection.

8. The broadcasting receiver according to claim 7, wherein the information OSD is outputted to the display means when the user selects and inputs a predetermined key under the condition that the broadcast program is outputted to the display means.

9. The broadcasting receiver according to claim 6, wherein the program list determiner maintains or releases the connection with the Internet TV according to a result of the determination as to whether the broadcasting receiver has been connected with the Internet TV, if it is determined that the title information or identifier information is not included in the program list.

10. A broadcasting receiver comprising:

a program information determiner for parsing PSIP information of a plurality of broadcast programs received through a tuner of the broadcasting receiver to determine title information or identifier information of the broadcast programs;

a program list determiner for determining whether the broadcasting receiver has been connected with an Internet TV, and then determining whether the title information or identifier information is included in a program list of the Internet TV, upon determining that the broadcasting receiver has been connected with the Internet TV;

a user interface unit for outputting, to display means, a user interface including information about whether the title information or identifier information is included in the program list; and wherein the program list determiner accesses an Internet server associated with the Internet TV to determine whether the title information or identifier information is included in the program list of the Internet TV, if it is determined that the broadcasting receiver has not been connected with the Internet TV.

\* \* \* \* \*